(12) United States Patent
Winkelsträter

(10) Patent No.: US 10,491,488 B2
(45) Date of Patent: Nov. 26, 2019

(54) HIGH-AVAILABILITY COMPUTER SYSTEM, WORKING METHOD AND THE USE THEREOF

(71) Applicant: FUJITSU LIMITED, Kawasaki-shi, Kanagawa (JP)

(72) Inventor: Bernd Winkelsträter, Paderborn (DE)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 15/831,794

(22) Filed: Dec. 5, 2017

(65) Prior Publication Data

US 2018/0097708 A1 Apr. 5, 2018

Related U.S. Application Data

(63) Continuation of application No. 14/418,498, filed as application No. PCT/EP2013/066020 on Jul. 30, 2013, now Pat. No. 9,871,704.

(30) Foreign Application Priority Data

Aug. 3, 2012 (DE) .................. 10 2012 107 157
Aug. 31, 2012 (DE) .................. 10 2012 108 117

(51) Int. Cl.
*G06F 15/16* (2006.01)
*H04L 12/24* (2006.01)
(Continued)

(52) U.S. Cl.
CPC ...... *H04L 41/5019* (2013.01); *G06F 11/2038* (2013.01); *G06F 11/2043* (2013.01);
(Continued)

(58) Field of Classification Search
CPC .................. H04L 67/1097; H04L 69/329
See application file for complete search history.

(56) References Cited

U.S. PATENT DOCUMENTS 6,438,705 B1 8/2002 Chao et al.
6,718,347 B1 * 4/2004 Wilson ............... G06F 16/27
(Continued)

FOREIGN PATENT DOCUMENTS

EP 2254050 A2 11/2010
JP 10-134012 5/1998
(Continued)

OTHER PUBLICATIONS

JPOA—Japanese Office Action dated Sep. 27, 2016 issued for Japanese Patent Application No. 2015-524765, with English translation.
(Continued)

*Primary Examiner* — Hieu T Hoang
(74) *Attorney, Agent, or Firm* — Fujitsu Patent Center

(57) ABSTRACT

A high-availability computer system includes a plurality of computer nodes for parallel data processing, wherein each computer node has at least one data processing component and a main memory. The computer system furthermore includes a plurality of storage nodes, wherein each storage node has at least one non-volatile mass storage device. The plurality of computer nodes are partitioned into a plurality of computer groups, wherein each of the plurality of computer groups has at least one redundant computer node. Each computer group has a local connection structure allocated to the respective computer group, the structure connecting the storage nodes allocated to the respective computer group to the computer nodes of the respective computer group.

16 Claims, 6 Drawing Sheets

(51) Int. Cl.
*G06F 11/20* (2006.01)
*H04L 29/08* (2006.01)

(52) U.S. Cl.
CPC .......... *H04L 41/12* (2013.01); *H04L 67/1097* (2013.01); *H04L 69/329* (2013.01)

(56) References Cited

U.S. PATENT DOCUMENTS

| | | | |
|---|---|---|---|
| 6,892,205 B1* | 5/2005 | Colrain | G06F 16/24552 |
| 7,050,961 B1* | 5/2006 | Lee | H04L 67/306 |
| | | | 703/22 |
| 2003/0028509 A1* | 2/2003 | Sah | G06F 16/284 |
| 2005/0044301 A1* | 2/2005 | Vasilevsky | G06F 9/45533 |
| | | | 711/1 |
| 2005/0278445 A1* | 12/2005 | Quang | H04L 67/1095 |
| | | | 709/226 |
| 2006/0190453 A1* | 8/2006 | Colrain | G06F 11/0715 |
| 2007/0088755 A1* | 4/2007 | Nesbitt | G06F 16/166 |
| 2008/0250267 A1* | 10/2008 | Brown | G06F 11/1482 |
| | | | 714/4.1 |
| 2010/0235409 A1* | 9/2010 | Roy | G06F 16/1827 |
| | | | 707/812 |
| 2011/0307470 A1* | 12/2011 | Kamimura | G06F 16/27 |
| | | | 707/713 |
| 2012/0066407 A1 | 3/2012 | Andres et al. | |
| 2012/0166886 A1* | 6/2012 | Shankar | G06F 11/2028 |
| | | | 714/43 |
| 2012/0233496 A1* | 9/2012 | Gil | G06F 11/2025 |
| | | | 714/4.11 |

FOREIGN PATENT DOCUMENTS

| | | |
|---|---|---|
| JP | 2000-222373 | 8/2000 |
| JP | 2001-256071 | 9/2001 |
| JP | 2003-131900 | 5/2003 |
| JP | 2007-510208 | 4/2007 |
| WO | 2012/070292 | 5/2012 |

OTHER PUBLICATIONS

Notice of Reasons for Rejection dated Feb. 2, 2016 of corresponding Japanese Application No. 2015-524765, with English translation.

Plattner, H., "A Common Database Approach for OLTP and OLAP Using an In-Memory Column Database," Proceedings of the 2009 ACM SIGMOD International Conference on Management of Data, Jun. 29, 2009, pp. 1-7.

Gereon Vey and Ilya Krutov, "SAEP In-memory Computing on IBM eX5 Systems", First Edition, Jan. 2012, URL:http://www.redbooks.ibm.com.redpapers/pdf/redp4814.pdf.

USPTO, [Hoang], Non-Final Rejection dated Feb. 3, 2017 in related U.S. Appl. No. 14/418,498.

USPT0, [HOANG], Final Rejection dated Jun. 7, 2017 in related U.S. Appl. No. 14/418,498.

USPTO, [HOANG], Advisory Action dated Aug. 14, 2017 in related U.S. Appl. No. 14/418,498.

USPTO, [HOANG], Notice of Allowance dated Sep. 25, 2017 in related U.S. Appl. No. 14/418,498.

Please note that the above listed references are of record in the parent U.S. Appl. No. 14/418,498. Thus, copies are not being submitted herewith.

* cited by examiner

HIGH-AVAILABILITY COMPUTER SYSTEM, WORKING METHOD AND THE USE THEREOF

CROSS-REFERENCE TO RELATED APPLICATION

This application is a continuation of application Ser. No. 14/418,498, filed Jan. 30, 2015, which is a National Stage Entry of International Application PCT/EP2013/066020 filed on Jul. 30, 2013, claiming priority of German Application Nos. 10 2012 108 117.4 filed Aug. 31, 2012 and 10 2012 107 157.8 filed Aug. 3, 2012; and designated the US, the entire contents of which are incorporated herein by reference.

TECHNICAL FIELD

This disclosure relates to a high-availability computer system, comprising a plurality of computer nodes for parallel data processing, wherein each computer node has at least one data processing component and a main memory. The disclosure furthermore relates to a working method for a computer system of this type.

BACKGROUND

High-availability computer systems are, generally understood to be computer systems in which some or all components are designed as redundant so that, if at least one single component of the computer system fails, a task required by a user can continue to be performed on the whole. Computer systems of this type are used for particularly important and/or time-critical tasks in the field of electronic data processing.

One possible application consists of parallel data processing of the type that occurs, for example, in in-memory databases, i.e., in database systems which store at least a large part of the data to be processed in one or more main memories of the computer system. Databases of that type are in some instances also known as main-memory-resident databases and are characterized, inter alia, in that the data are optimized for storage in the main memory and not, as in conventional databases, irrespective of the size of the data, for storage in a permanent storage device, in particular a hard disk drive.

Known arrangements of computer systems for parallel data processing with a plurality of computer nodes normally have at least one redundant computer node which, if any given computer node fails, can take over the work of the failed computer node. The redundant computer node then essentially provides the same computer performance as the failed computer node so that, from the perspective of a user, the high-availability computer system still has the same overall computer performance. However, the problem with an arrangement of that type, particularly where in-memory databases are used, is that considerable delay times can occur due to the loading of the data previously processed by the failed computer into the main memory of the redundant computer node.

It could therefore be helpful to provide a high-availability computer system of the aforementioned type, the performance and availability of which are further improved. A reduction in the waiting time in the event of failure of an individual computer is referred. A high-availability computer system of this type should be suitable, in particular, for the fast and high-availability implementation of in-memory databases.

SUMMARY

I provide a high-availability computer system including a plurality of computer nodes for parallel data processing, wherein each computer node has at least one data processing component and a main memory, a plurality of storage nodes, wherein each storage node has at least one non-volatile mass storage device, and at least one data network that accesses the plurality of computer nodes, wherein the plurality of computer nodes is partitioned into a plurality of computer groups, each or the plurality of computer groups has at least one redundant computer node, each storage node of the plurality of storage nodes is allocated to precisely one computer group of the plurality of computer groups, and each computer group has a local connection structure allocated to the respective computer group, the structure connecting the storage nodes allocated to the respective computer group to computer nodes of the respective computer group.

I also provide a working method for the high-availability computer system, with a first number (n) of computer nodes for parallel data processing including dividing which data (D) to be processed in parallel into a second number (s) of data segments (d), and partitioning the first number (n) of computer nodes into a third number (m) of computer groups, wherein the second number (s) is less than or equal to, the difference (n−m) between the first number (n) and the third number (m) and the third number (m) is greater than or equal to two.

I further provide a database device configured as a high-availability computer system that provides a parallel-operating database, data of which are divided into a plurality of independently interrogatable database segments including a plurality of computer nodes for parallel data processing, wherein each computer node, has at least one data processing component and a main memory, a plurality of storage nodes, wherein each storage node has at least one non-volatile mass storage device, and at least one data network to access the plurality of computer nodes, wherein the plurality of computer nodes is partitioned into a plurality of computer groups, each of the plurality of computer groups has at least one redundant computer node, each storage node of the plurality of storage nodes is allocated to precisely one computer group of the plurality of computer groups, each computer group has a local connection structure allocated to the respective computer group, the structure connecting the storage nodes allocated to the respective computer group to computer nodes of the respective computer group, and in operation of the computer system, each database segment is allocated to a computer node of the plurality of computer nodes and stored in the data memory of the allocated computer node.

REFERENCE NUMBER LIST

Figure 1:
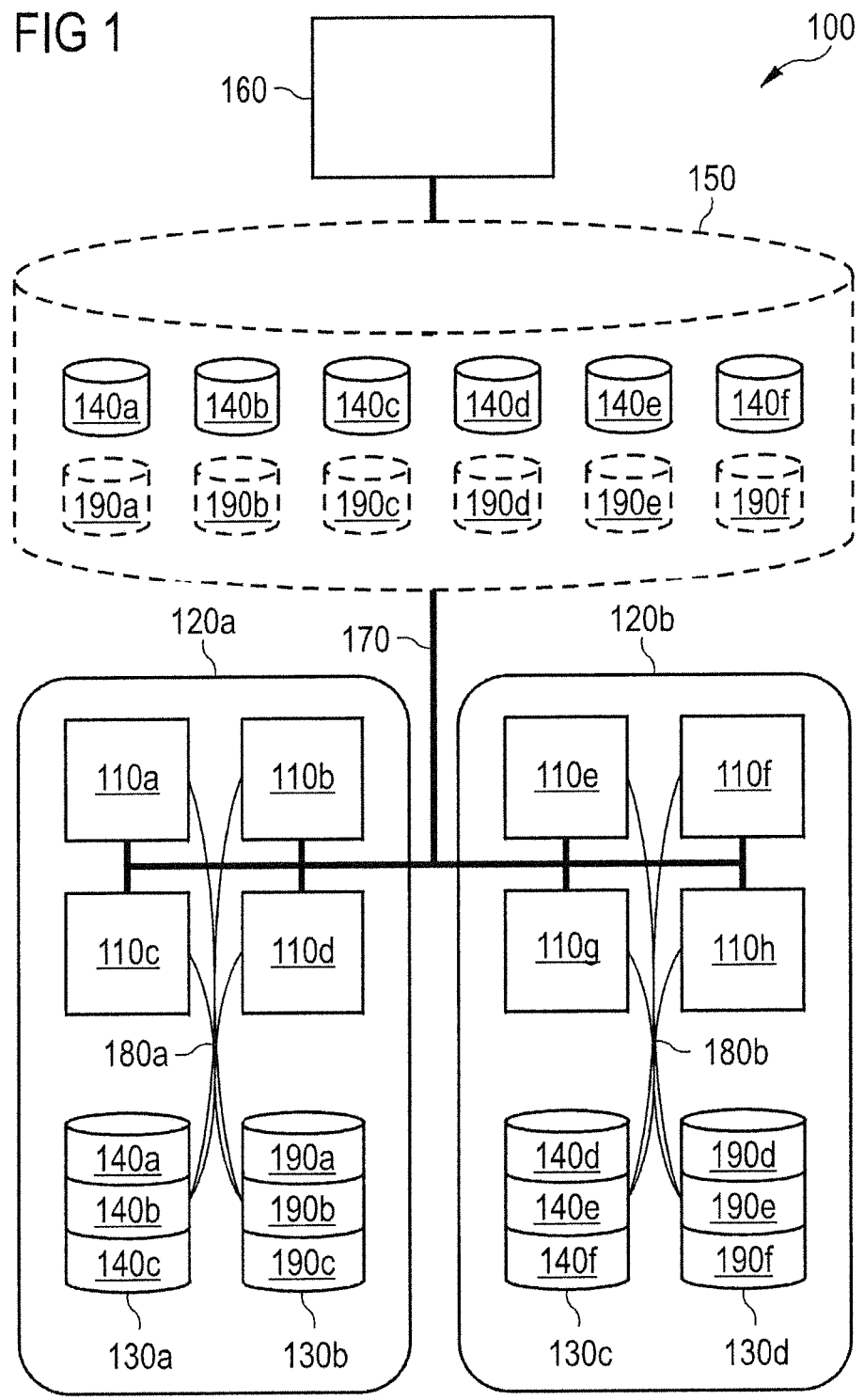
FIG. 1 shows a schematic representation of a high-availability computer system.

100 High-availability computer system
110 Computer node
120 Computer group
130 Storage node
140 Database segment
150 Database
160 Client computer
170 Data network
180 Switching fabric
190 Log file
200 High-availability computer system
210 HANA server
220 Failover group
230 Storage device
240 Host adapter
250 Local mass storage device
260 Network interface
280 SAS switch
300 High-availability computer system
310 HANA server
320 Failover group
330 Storage device
340 PCIe storage box
400 High-availability computer system
410 HANA server
420 Failover group
440 PCIe storage box
500 Initialization method
510 to 550 Method steps
600 Operating method
610 to 650 Method steps

DETAILED DESCRIPTION

I provide a high-availability computer system comprising a plurality of computer nodes for parallel data processing, wherein each computer node has at least one data processing component and a main memory. The high-availability computer system furthermore comprises a plurality of storage nodes, wherein each storage node has at least one non-volatile mass storage device, and at least one data network for accessing the plurality of computer nodes. The plurality of computer nodes is partitioned into a plurality of computer groups, wherein each of the plurality of computer groups has at least one redundant computer node. Each storage node of the plurality of storage nodes is allocated to precisely one computer group of the plurality of computer groups, and each computer group has a local connection structure allocated to the respective computer group, the structure connecting the storage nodes allocated to the respective computer group to the computer nodes of the respective computer group.

Due to the division of a plurality of computer nodes into a plurality of computer groups with at least one redundant computer node in conjunction with a local connection structure allocated to each computer group and at least one storage node allocated to the computer group, the data transmission rate between the storage nodes and the computer nodes connected to them can be increased. In particular, this enables loading data of a failed computer node from a storage node locally connected to a redundant computer node so that the redundant storage node is ready for use more quickly than in known architectures with a central storage device to replace the failed computer node.

A further advantage is that, when the computer system is started, a multiplicity of independent storage nodes and connection structures separated from one another for each group can be used to load data.

Finally, any permanent backup and restoration of data from the main memory of one of the computer nodes in the local storage node is speeded up, which is advantageous, particularly in combined Online Analytical Processing (OLAP) and Online Transaction Processing (OLTP).

A lesser degree of branching, also known as "fan-out," and shorter line paths than in known systems are in fact enabled with a comparable number of computer nodes due to the described division. Consequently, fewer disadvantageous effects such as, for example, a signal delay or distortion on individual data lines, or an offset of signals of a plurality of parallel data lines or data paths, also referred to as "skew," occur in the local connection structures which are separated from one another. Also, with the use of optical connection structures, shortening the local connection structures is advantageous as this then results in no or only very little dispersion of different wavelengths used in parallel for the data transmission.

Advantageously, the computer system may provide a parallel-operating database, the data of which are divided into a plurality of independently interrogatable database segments. In the operation of the computer system, each database segment is allocated to a computer node of the plurality of computer nodes and stored in the data memory of the allocated computer node. A computer system of this type is suitable, in particular, to implement of in-memory databases of the type used, in particular, in data mining and other high-performance database applications. Due to segmentation of the data of the database into database segments which can be interrogated independently from one another, their storage, inter alia, in storage nodes locally connected to the computer nodes of a computer group is enabled. Due to parallelization and local storage, the time to access the stored data is reduced and the response time and possible data rate of the database are increased on the whole both in normal operation and also in the event of failure of an individual node ("failover").

Advantageously, a second number of database segments may be allocated to at least one first computer group with a first number of computer nodes, wherein the second number is smaller than the first number and wherein the database data allocated to the second number of database segments are permanently stored on the storage nodes allocated to the first computer group. If more computer nodes than data segments to be processed are allocated in a computer group, it is guaranteed that at least one computer node is available as a redundant replacement node to interrogate a database segment allocated to the computer group.

Further advantageously, each computer node of the first computer group may be configured to permanently store database changes on at least one storage node allocated to the first computer group so that, if a first computer node of the first computer group fails, the at least one redundant computer node of the first computer group can take over the tasks of the failed first computer node by loading the data of the database segment allocated to the first computer node and/or the database changes of the first computer node from a storage node locally connected to the redundant computer node. Due to the loading of database segments or database changes from a storage node locally connected to the redundant computer node, the takeover time between the failure of the first computer node and the takeover of its tasks by the redundant computer node can be reduced.

Advantageously, the at least one local connection structure may be a parallel switching fabric for the selective connection of the computer nodes of the first computer group to the storage nodes allocated to the first computer group via a plurality of connection paths parallel to one another. A parallel network fabric or switching fabric has considerable performance advantages over other connection topologies such as, in particular, local networks according to the Ethernet standard, and allows, inter alia, the establishment of a plurality of connections parallel to one another.

Further advantageously, at least one first computer node of at least one first computer group is arranged in a first module of a server system, for example a blade or rack server system, and a first storage node allocated to the first computer group is arranged in a second module of the server system. The first computer node and the first storage node are interconnected via at least one Direct Attached Storage (DAS) connection. The spatially adjacent arrangement of components of the high-availability computer system, for example in rack servers screwed into conventional 19" rack housings and storage devices of a shared rack server system, allows, the use of DAS connections with relatively short line paths which, compared with general network connections, allow an increased data transmission rate, reduced latency time and, where relevant, a larger number of parallel connections.

The DAS connection is, for example, a data connection according to the Small Computer System Interface (SCSI) and/or the PCI Express (PCIe) standard, in particular according to the Serial Attached SCSI (SAS) and/or the SCSI over PCIe (SOP) standard.

Alternatively, a first computer node of at least one first computer group and at least one first storage node allocated to the first computer group may be interconnected via at least one serially coded high-speed line, in particular according to the InfiniBand standard. The InfiniBand standard or technically similar, serially coded high-speed lines also allow the connection of a storage node to one or more computer nodes at a particularly high speed of, for example, 2.5, 5, 10, 20 or more Gbit/s. Despite the serial coding in relation to a common clock signal, a connection of this type may, where relevant, have a plurality of data lines parallel to one another.

Further advantageously, at least two computer nodes of a first computer group may be interconnected via the local connection structure allocated to the computer group such that the first computer node can access the content of the main memory of the second computer node directly according to a Remote Direct Memory Access (RDMA) protocol. The use of connections according to RDMA protocols such as, for example, the InfiniBand Verbs Layer, the Internet Wide Area RDMA protocol (iWARP), the RDMA over Converged Ethernet (RoCE) and other RDMA standards such as those, for example, described at http://www.openfabrics.org, enables the even faster transfer of data of a computer onto a redundant computer node, insofar as the memory of the first computer node can still be accessed. A design of this type is suitable, inter alia, for high-availability computer systems in which each computer node has a built-in, non-volatile mass storage device as a storage node.

Further advantageously, at least one first storage node may have a controller with a plurality of access ports for the simultaneous connection to a plurality of computer nodes of the computer group allocated to the storage node. Alternatively or additionally, a first computer node of a computer group has a host bus adapter with a plurality of access ports for the simultaneous connection to a plurality of storage nodes allocated to the computer group. A computer or storage node configuration of this type is suitable to establish a plurality of direct connections between a group of computer and storage nodes allocated to one another.

Performance of the high-availability computer system can be further improved if at least one first storage node has at least one semiconductor mass storage device. Particularly if semiconductor mass storage devices are used as non-volatile mass storage devices of the storage nodes, the data transmission rates known from known network technologies and topologies are normally inadequate, with simultaneous connection of a multiplicity of computer nodes to utilize a maximum data transmission rate of the storage medium. However, due to division of the computer system into a plurality of computer groups partially independent from one another with local connection structures independent from one another, the data transmission rate, as provided by semiconductor mass storage devices, can be totally or largely exploited with known technologies.

I also provide a working method for a high-availability computer system, for example. The high-availability computer system has a first number of computer nodes for parallel data processing. In the working method, data to be processed in parallel are divided into a second number of data segments and the first number of computer nodes is partitioned into a third number of computer groups. The second number is less than or equal to the difference between the first number and the third number and the third number is greater than or equal to two.

By a working method of this type, data to be processed in parallel can be better distributed over a number of computer nodes, each with at least one redundant computer node. To do this, the existing first number of computer nodes is partitioned into a third number of computer groups with a redundant computer node and the data to be processed are divided into a corresponding second number of data segments. Instead of the usual n+1 configuration with n computer nodes used for parallel data processing and one redundantly retained computer node, m computer groups in each case with one (or more) redundant computer nodes are provided so that an n+m configuration is produced overall. If one redundant computer node is to be retained for each group, n−m computer nodes are still available for parallel data processing from the n computer nodes in total, after deduction of m redundant computer nodes (in each case one computer node for each of the m computer groups). A corresponding partitioning of the data to be processed into a maximum of n−m data segments then allows an allocation of the individual data segments to the computer nodes such that one redundant computer node per computer group can be retained.

Advantageously, the data to be processed of at least those data segments which are processed by the computer nodes allocated to a first computer group may be permanently stored in at least one storage node allocated to the first computer group and locally connected to the computer nodes of the first computer group. Due to the local storage of data segments in storage nodes of the first computer group, the data transmission rate and latency time when the stored data segments are accessed by the computer nodes of the computer group can be improved.

Further advantageously, each computer node of the first computer group permanently may store database changes on at least one storage node allocated to the first computer group and locally connected to the computer nodes of the first computer group so that, if a first computer node of the first computer group fails, at least one redundant second computer node of the first computer group can take over the tasks of the failed computer node by loading the data allocated to the data segment and/or database changes from a storage node locally connected to the redundant computer node. A working method of this type speeds up, in particular, the takeover of tasks in a transaction-oriented system.

I further provide a high-availability computer system and/or a working method in a database device, in particular an On-Line Analytical Processing (OLAP) or an On-Line Transaction Processing (OLTP) database appliance or an in-memory database appliance.

Appliances, i.e., devices, of this type in which hardware and software can be particularly closely aligned with one another enable running of particularly high-performance database applications such as those which are suitable, for example, for data mining or high-end databases with a parallel interrogation capability in communication networks and devices.

My systems and methods are described in detail below by examples with reference to the attached figures. The same components or components of the same type are denoted by the same reference numbers. For better distinguishability, different instances of the same components or components of the same type are denoted by an alphabetical suffix, which is omitted where reference is made to all instances of the respective component in the description.

FIG. 1 shows schematically a high-availability computer system 100. The computer system 100 comprises a plurality of computer nodes 110a to 110h partitioned into two computer groups 120a and 120b in the example shown.

A partitioning means the overlap-free division of the total quantity of the computer nodes 110 into subgroups. Instead of the division shown in FIG. 1 of eight computer nodes 110 into two groups 120, each with four computer nodes 110, a division, for example, into the computer groups 120, each with two computer nodes 110, or a division into two computer groups, each with three computer nodes 110, and a third computer group 120 with two computer nodes 110 are also possible. A division in which the computer node 110 which is not needed for a current data processing requirement is not allocated to any of the computer groups 120 is, in principle, also possible.

The computer groups 120a and 120b shown in FIG. 1 furthermore comprise two storage nodes 130a and 130b and 130c and 130d, respectively. The storage nodes 130 are, for example, Direct Attached Storage (DAS) devices locally connected to the computer node 110. In the example, the storage nodes 130a and 130c are in each case a rack module with a plurality of magnetic mass storage drives in the form of hard disks. The storage nodes 130b and 130d, on the other hand, are rack modules with a plurality of non-volatile semiconductor mass storage devices, i.e., Solid State Disks (SSD). Alternatively, the storage nodes 130a to 130d may also comprise magnetic mass storage drives only, in the form of hard disks, non-volatile conductor mass storage devices or hybrid mass storage devices.

The respective first storage node 130a and 130c of the first group 120a and the second group 120b respectively serve to store database segments 140a to 140c and 140d to 140f, respectively which at least in logical terms, together form a database 150. The database 150 is shown by broken lines in the presentation according to FIG. 1 since the data stored therein are not stored in their entirety in any of the storage nodes 130a to 130d shown in FIG. 1. Nevertheless, the combination of the individual database segments 140a to 140f produces a database 150 which is uniformly interrogatable for a user. In fact, combination of database segments 140a to 140f is preferably a memory extract or "snapshot" of the active storage nodes 110, which is produced, for example, every five minutes. A plurality of versions are normally retained for reasons of operational reliability. Together with information for a "roll forward" of the log files 190 shown by dotted dines in FIG. 1 and later described, the latter produce the current database. A partially or completely overlapping storage of database segments 140 in some or all storage nodes 130 is obviously also possible. As a result, in particular, a redundancy can be created if one or more storage nodes 130 fails. Similarly, the content of parts or all of the database 150 can be stored in an external mass storage system, not shown in FIG. 1.

The database 150 shown in FIG. 1 can be interrogated by one or more client computers 160. To do this, the client computer 160 shown in FIG. 1 connects, via a data network 170 to the individual computer nodes 110. The division of a query among the individual computer nodes 110 is typically effected by one or more central management components. However, in the interests of clarity, these are not shown in FIG. 1. From a logical perspective, the client computer 160 therefore sends its queries in parallel to all computer nodes 110 of the too computer groups 110 and 120b, wherein each computer node 110 processes only a partial query relating to the database segment 140 allocated to it.

To load data into the main memory and, where relevant, for subsequent processing of the partial queries, four computer nodes 110a to 110d of the first computer group 120a connect via a switching fabric 180 directly to the two storage nodes 130a and 130b, in an equivalent manner, the computer nodes 110e to 110h of the second computer group 120b connect via a switching fabric 180b to the storage nodes 130c and 130d.

In the configuration shown in FIG. 1, the computer nodes 110a to 110c of the first computer group 120a process one data segment 440a to 140c. The computer nodes 110e to 110g process database queries relating to the database segments 140d to 140f. The respective fourth computer node 110d and 110h is retained as a redundant replacement computer node for the first computer group 120a and the second computer group 120b respectively. Since each of the computer nodes 110a to 110c and 110e 110g can retrieve the database segment 140a to 140e and 140d to 140f respectively to be processed by it via the switching fabric 180a and 180b respectively from the local storage node 130a and 130c respectively, compared to the use of a common storage device, for example, a central NAS system and/or a common connection structure, for example, of a local Ethernet network, the achievable data transmission rate is increased and the achievable latency time is reduced for all computer nodes 110.

The switching fabrics 180 connect the computer nodes 110 to the local storage node 130 via relatively short connection paths. This may entail, for example, cable connections within a rack server with a built-in mass storage device, the conductor paths of a midplane within a blade system, or cable or backplane connections within or to a spatially adjacently set up, conventional 19" rack system. These line paths are typically shorter than 25 m, preferably shorter than 2 m, more preferably even shorter than 1 m, more preferably even shorter than 50 cm. Due to the short line paths, hardly any significant signal delays, latency times, reflections or distortions occur therein so that, even with unchanged transmission technology, a higher transmission bandwidth can normally be achieved than in connections over longer distances, for example, from a first rack system with a multiplicity of computer nodes 110 to a second rack system with a multiplicity of storage nodes 130.

Particularly high data transmission rates can be achieved due to the short connection paths within the switching fabric 180a and 180b. If the individual computer nodes 110 connect, for example, via a local network on the basis of the Ethernet protocol family IEEE 802.3x with a gross bandwidth of one or ten Gbit/s, the connections between the computer nodes 110 of a group 120 and the storage nodes 130 can be established significantly more quickly, for example With an SAS, PCIe, InfiniBand or Fiber Channel connection with a gross bandwidth of 16 Gbit/s or 32 Gbit/s or more. The difference between the respective net bandwidths is relatively even greater since a dedicated storage connection normally requires a smaller protocol overhead than a general network protocol such as IEEE 802.3xx or TCP/IP.

The net and/or gross bandwidth of the connection between the computer nodes 110 of a group 120 is thus greater than the net or gross bandwidth of a connection of computer nodes 110 of different groups 120a and 120b. The bandwidth of the storage connection within a group 120 is preferably greater by a factor of two, even more preferably by a factor of four, than the bandwidth of the connections between the groups 120.

The bandwidth is preferably understood to mean the "bi-sectional bandwidth," i.e., the bandwidth of a connection between two parts of an entire networked system. Within the meaning of this definition, the bi-sectional bandwidth, in a division of the computer, system 100 within one group 120, for example between the computer nodes 110a and 110c on the one hand and the computer nodes 110b and 110d on the other hand, is greater than the bi-sectional bandwidth in a division of the computer system 100 between two groups 120, i.e., for example, between the computer nodes 110a to 110d on the one hand and the computer nodes 110e to 110h on the other hand. Although a node 110 of the second group 120b could, in principle, also take over the tasks of a failed computer node 110 of the first group 120a, due to the lower bisectional bandwidth this would result in a substantial loss of performance of the computer system 100 as a whole, compared to a takeover by a computer node 110 of the first group 120a.

Within the meaning of the above description, the bandwidth is considered to be the transmission bandwidth for a single, strictly ordered connection, i.e. a connection in which the sequence of a packet or query sequence of the transmitter always remains guaranteed at the receiving end. Examples of strictly ordered connections of this type are, for example, PCI Express connections with a plurality of parallel data lines, for example one x16 PCIe connection with 16 parallel, electrically differential data lines per transmission direction, i.e., one to send and one to transmit ("dual-simplex"), in which individual bits or bytes of a network query are distributed among the individual data lines without loss of the order ("striping"). Instead of electrical data lines, optical connections can obviously also be used, in particular optical waveguide connections with a plurality of transmission frequencies or carrier wavelengths physically independent from one another by wavelength division multiplexing (WDM). In particular, a strictly ordered, parallel connection of this type thus differs from the mere parallel connection of a plurality of physically independent connections which could result in a loss of the strict order with no additional protocol or other management overhead. One example of an unordered connection arrangement of this type would be the interconnection ("trunking") of a plurality of Gigabit Ethernet connections.

The lesser degree of branching within the groups 120 therefore also allows an increase in the parallelism of the individual connections. This is achieved, on the one hand, by the short connection paths themselves since problems such as a loss of synchronization of parallel-transmitted electrical signals or dispersion through optical transmission by different carrier wavelengths transmitted by different transit delays of signals transmitted via independent transmission paths, do not even occur. The degree of parallelism of the connections within one group is preferably four or more.

In addition, implementation of the required connection structure itself, particularly switching elements, is substantially simplified or first enabled. For example, PCI Express switching modules currently available on the market have a fixed, predefined number, for example, 96 of switchable connections for each PCI Express lane. i.e. a single data line. If the 96 connections were used to connect 80 computer nodes 110 to one storage node 130 connected via x16 PCIe via 16 connections on the uplink, only one single connection (corresponding to a downlink by x1 PCIe) would be available per computer node 110. Conversely, if the computer nodes 110 are divided into groups 120, with five computer nodes 110, 16 connections are available within one group 120 for each computer node 110 (corresponding to x16 PCIe). The degree of parallelism per connection is preferably greater than two, even more preferably greater than four, even more preferably even greater than the degree of branching, i.e., the size of the group 120.

In principle, the use of a multiplicity of switching components to achieve a comparable degree of parallelism also appears possible. However, this is often impossible in practice since the number of data lines required for the complete parallel connection would increase proportionally to the number of computer nodes 110 and the degree of parallelism. The space available on a backplane or midplane of the computer system 100 or in the cabling area of a rack system is not sufficient, however, to arrange a sufficient number of data lines for a desirable degree of parallelism of, for example, four or more data lines per computer node 110 for a multiplicity of computer nodes, for example more than 20 computer nodes 110. Furthermore, the costs of producing a to of connections with a high degree of parallelism are disproportionate.

To speed up the processing even further, the computer nodes 110 retain the database segment 140 processed by them completely in their main memory, for example a dynamic, volatile semiconductor memory. In this way, no access whatsoever to one of the storage nodes 130 is normally required to answer database queries. Furthermore, along with the row-oriented processing known from hard-disk-based database systems, the random access to the content of the main memory additionally or alternatively allows a column-oriented processing of the data of the database 150, which, depending on the task to be performed, often enables a more efficient presentation in the memory, in particular through compression, and thus allows a further increase in the processing speed.

If one of the computer nodes 110 fails, for example the computer node 110a of the first computer group 120a, the redundant computer node of the respective computer group 120, in the case described therefore the computer node 110d of the computer group 120a, takes over the task of the previously failed computer node 110. For this purpose, the computer node 110d loads the database segment 140a into its main memory and takes over processing of a possibly ongoing or subsequent user query. Since the redundant node 110d is arranged in the same computer group 120 as the failed computer node 110a, the computer node 110d can also access the local storage node 130a at the same speed as the first computer node 110a.

To be able to take over any partial results possibly already produced by the computer node 110a or transfer other status information from the failed computer system 110a onto the redundant computer node 110d, all computer nodes 110 of a computer group 120 store current memory extracts ("memory snapshots"), status data and/or transactional data or other database changes in a log file or on a different suitable data structure. For performance reasons, in the design according to FIG. 1, the log file is stored for the three database segments 140a to 140c in corresponding log files 190a to 190c of the second storage node 130b. Since the second storage node 130b, as described above, uses non-volatile semiconductor mass storage devices as a storage medium, the data transmission rates and data access times achievable via the switching fabric 180 for the second storage node 130b are even better than those of the first storage node 130a. Accordingly, if the first computer node 110a fails, the redundant computer node 110 can be switched particularly quickly to an equivalent operating state which the computer node 110a had before the failure.

Figure 2:
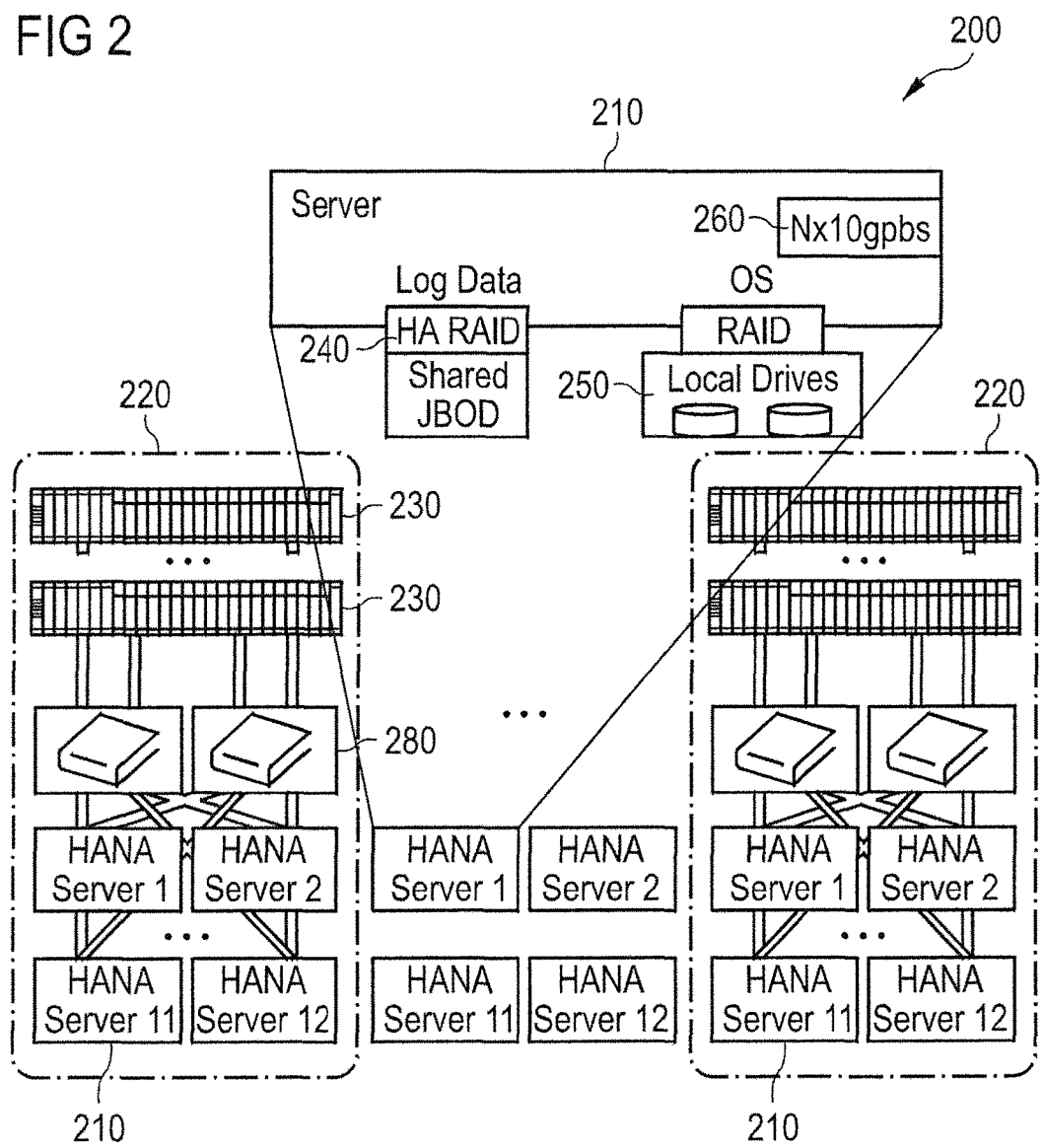
FIG. 2 shows a first design of a high-availability computer system.

FIG. 2 shows a specific configuration for a high-availability computer system 200 according to a first example. In the example shown, a plurality of computer groups comprise 12 HANA servers 210, of which, however, only four HANA servers are shown for reasons of clarity. A computer node for use in the "High Performance Analytic Appliance" according to the database technology of SAP AG is, referred to as a HANA server 210. The respective 12 HANA servers 210 together form an intrinsically redundant failover group 220.

The HANA servers 210 of a failover group 220 redundantly connect to two storage devices 230 via SAS switches 280 which are redundant in relation to one another. The connection bandwidth or parallelism of the individual connections between the SAS switches 280 and the storage devices 230 should preferably increase with the size of the failover group 220 and be adapted to the latter so that a HANA server 210 connected to the SAS switch 280 can, wherever possible, utilize its entire communication bandwidth. In the two storage devices 230 four dual-hosted storage systems are contained in a JBOD ("Just a Bunch Of Disks") configuration to store database segments 140 or log files 190. The storage capacity of the storage devices 230 is oriented in blocks for fast access to the data contained therein. Each of the local storage systems used in the storage devices 230 has two ports connecting the respective mass storage devices to the two switches 280. Each HANA server 210 comprises a host adapter 240 for random indirect access to the storage devices 230 via one of the switches 280. In this way, the failure of any given HANA server 210 or one of the switches 280 can be intercepted within the failover group 220. In the example described, the data themselves are also stored redundantly in the two storage devices 230.

In addition, each of the HANA servers 210 comprises one or more local mass storage devices 250 to store an operating system for the HANA server 210. Where relevant, memory snapshots of a data segment stored in the main memory can also be stored in the local mass storage device. Finally, the HANA server 210 has one or more network interfaces 260 connecting the HANA servers 210 to a data network 172 to receive user queries and return results and, where relevant, for further control tasks.

In the configuration according to FIG. 2, the number of computer nodes in the form of HANA servers or the number of storage nodes in the form of storage devices 230 or mass storage devices provided thereby is limited by the number of switch ports of the local connection structure in the form of SAS switches 280. In the example, the SAS switches 280 are configured to connect 12 HANA servers 210 and a maximum of eight JBOD storage systems with conventional hard disks with rotating, magnetic storage media. The configuration according to the example in FIG. 2 thus enables a relatively low-cost implementation of parallel database with relatively large groups of 12 computer nodes.

In an alternative design of the high-availability computer system 200, individual, some or all mass storage devices of the storage devices 230 are designed as non-volatile semiconductor mass storage devices. For example, the mass storage devices used to store log files 190 of a parallel database system can be designed as semiconductors mass storage devices, whereas the mass storage devices that store database segments 140 are designed as conventional magnetic hard disk drives. A configuration of this type represents a good compromise in terms of a maximum working speed of the high-availability computer system 200 on the one hand and the costs of the computer system to be set up on the other hand.

Figure 3:
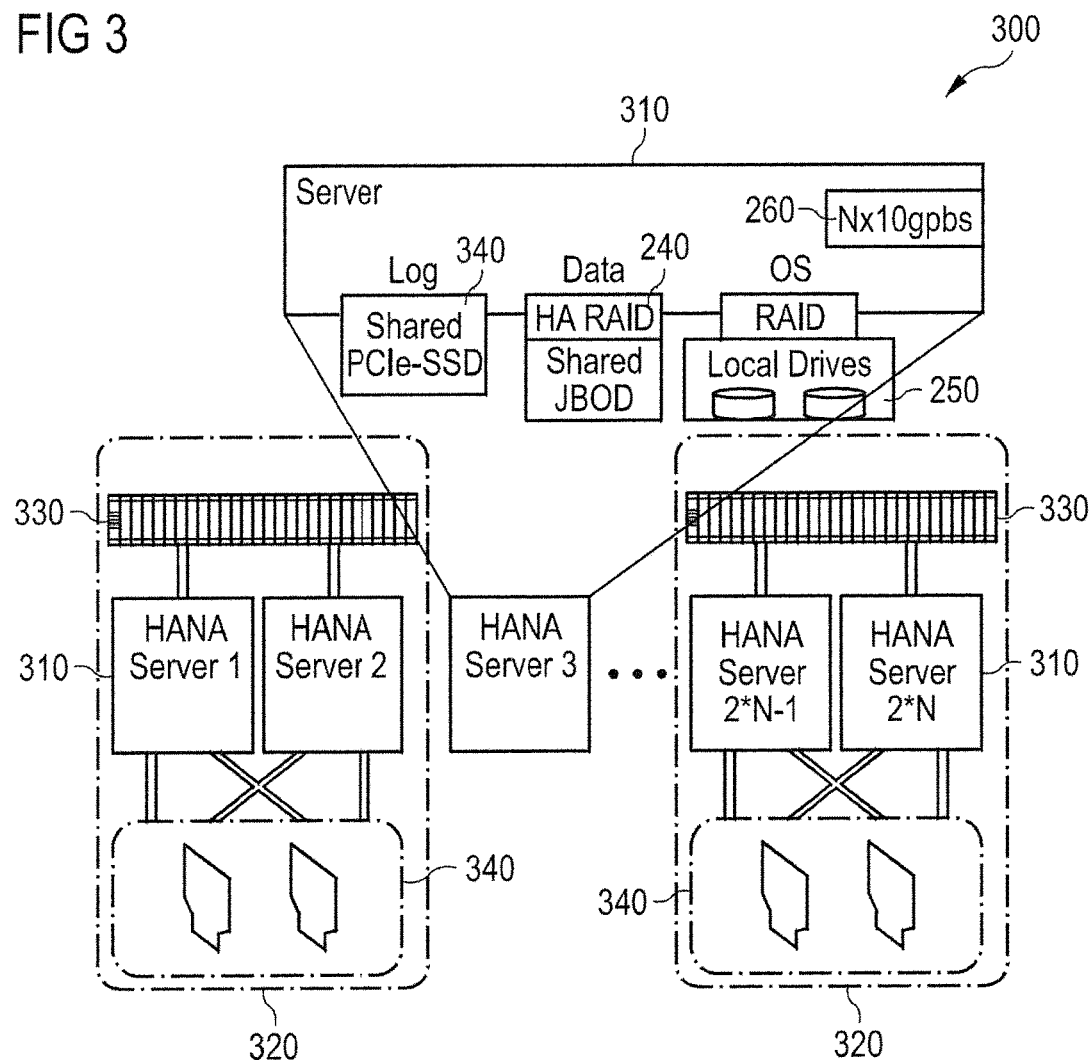
FIG. 3 shows a second design of a high-availability computer system.

FIG. 3 shows a further specific configuration of a high-availability computer system 300 according to a second design. In the design according to FIG. 3, only two HANA servers 310 are arranged in a common failover group 320. A comparable number n of active nodes results in a correspondingly higher total number of computer nodes since each failover group 320 has only one active and one redundant HANA server 310. This therefore produces a system of 2*n HANA servers 310 in n failover groups 320, each with one active HANA server 310.

The high-availability computer system 300 has one storage device 330 for each failover group 320 with conventional hard disk drives or particularly high-performance semiconductor mass storage devices to store database segments 140 of a database 150. The HANA servers 310 and the storage device 330 are preferably arranged in a common rack. In a manner different to that described above with reference to FIG. 2, the individual HANA servers 310 access the data of the storage device 330 directly via a host adapter 340 in a JBOD configuration, Conversely, the data of the log files 190 of the database system are stored on external PCIe storage boxes 340 comprising a plurality of semiconductor mass storage devices, each with two access ports for the connection to the two HANA servers 310. Each of the two HANA servers 310 of a failover group 320 directly connects via one or more PCIe lanes, i.e., differential high-speed lines, to the two PCIe storage boxes 340 or the semiconductor mass storage devices contained therein.

Compared to the access via an SAS host adapter, the access via the PCIe bus originally used as a computer-internal bus again allows significantly increased data transmission rates. In addition, due to the reduced group size of only two HANA servers 310 per failover group 320, fewer problems arise in accessing the storage devices 330 or the PCIe storage boxes 340 since, in normal operation, only one HANA server 310 accesses corresponding storage resources and can therefore use the entire bandwidth of the local connection structure. Finally, a further parallelization of the data transmission is enabled due to the division of the storage of the database segments 140 and the log files 190 among different physical storage media and local connection structures. On the whole, the configuration of the high-availability computer system 300 shown in FIG. 3 therefore enables an even higher overall performance than the configuration described with reference to FIG. 2.

Figure 4:
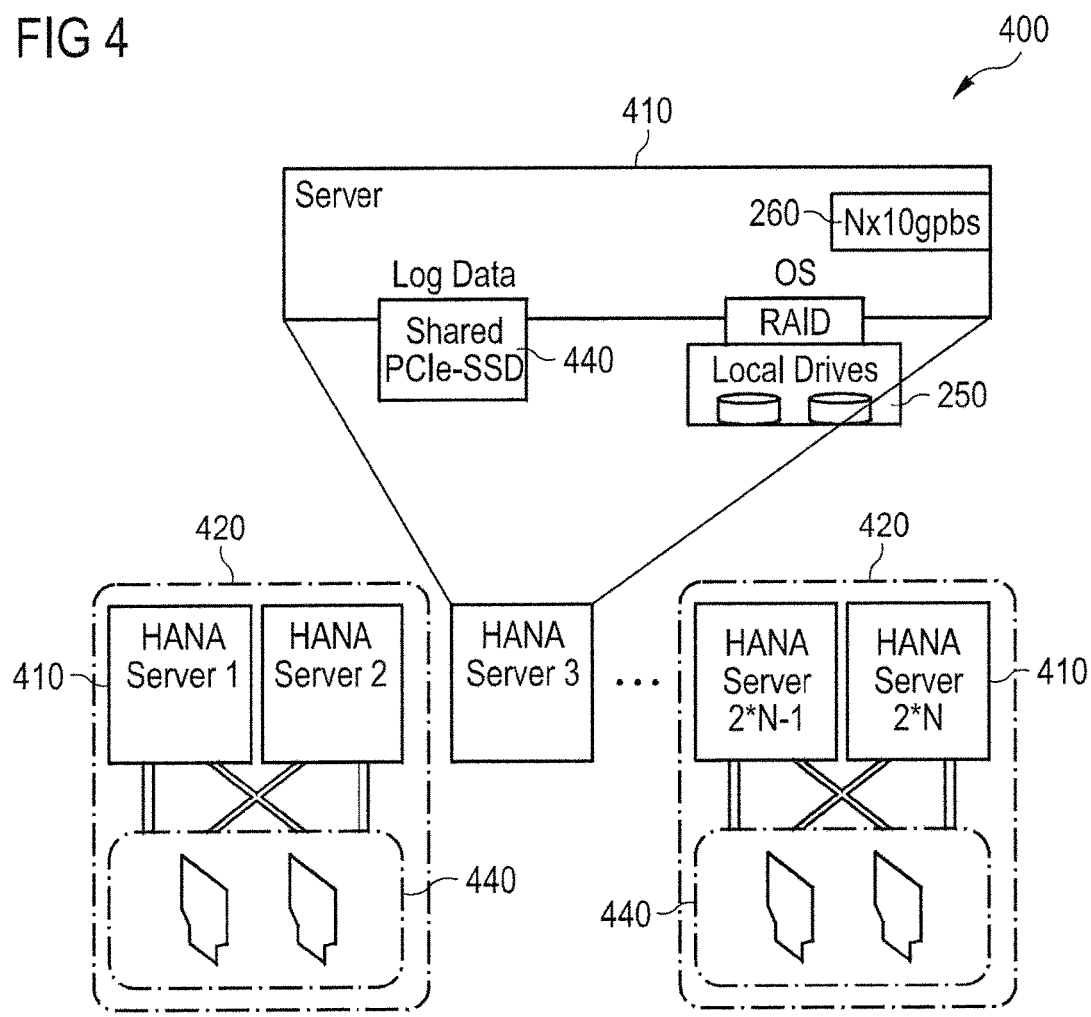
FIG. 4 shows a third design of a high-availability computer system.

FIG. 4 shows a further configuration of a high-availability computer system 400 according to a third design. As in the design according to FIG. 3, only two HANA servers 410 are arranged in a common failover group 420. As in FIG. 3, the log files 190 from the HANA servers 410 are stored on PCIe storage boxes 440 with semiconductor mass storage devices arranged therein, which permanently connect to the HANA servers 410 via a PCIe connection.

However, unlike the design according to FIG. 3, the database segments 140 themselves are also stored in the same or in a further PCIe storage box 440 in the design according to FIG. 4 so that the HANA servers 410 can also access the data segments 140 themselves at a particularly high speed. Due tea the costs incurred in connection with the particularly high-performance PCIe storage boxes 440 and the non-volatile semiconductor mass storage devices installed therein, the system shown in FIG. 4 is suitable in particular for scenarios in which maximum performance is required, regardless of the costs thereby incurred.

Via the specific configurations shown in FIGS. 2 to 4, a multiplicity of further computer configurations are conceivable in which a relatively small group of computer nodes 110 connect via suitable local connection structures to one or more local storage nodes 130 to enable a parallelization and therefore a speeding up of data access in the loading of large volumes of data into a multiplicity of computer nodes 110.

Figure 5:
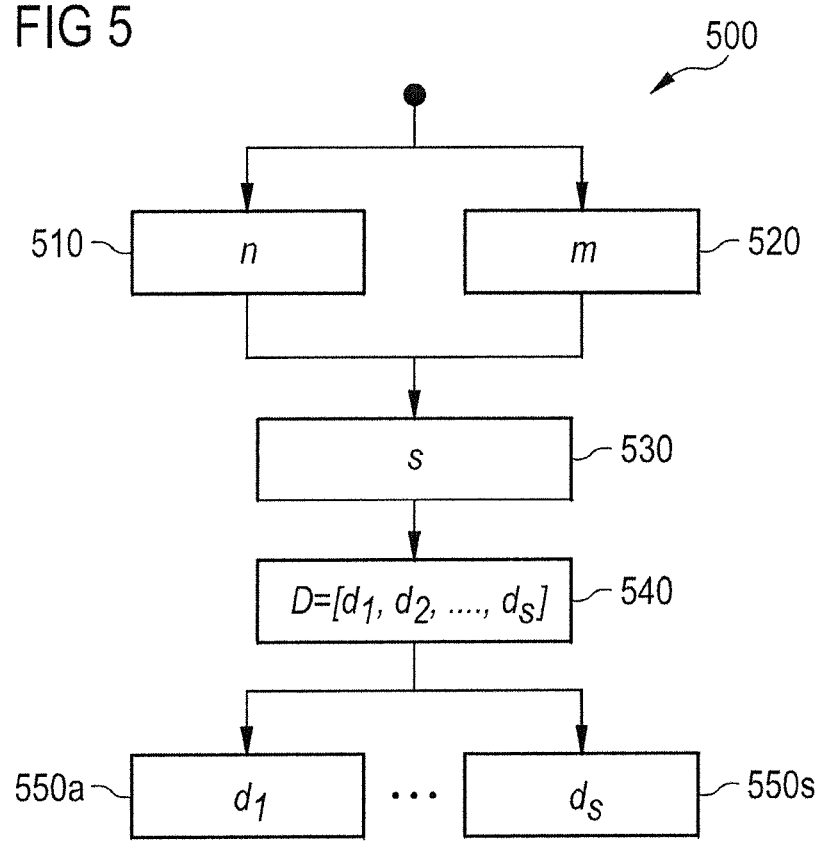
FIG. 5 shows a flow diagram of a method of initializing a high-availability computer system.

FIG. 5 shows schematically a method 500 of initializing a high-availability computer system, for example the computer system 100 according to FIG. 1.

The method 500 begins in steps 510 and 520 with the definition of the total number n of computer nodes 110 available in the computer system 100 and the definition of the number m of required computer groups 120. The number in of computer groups 120 is specified, for example, by the hardware configuration of a computer system 100 or by a service level agreement of an IT service provider, i.e., a contractual agreement. It must be taken into account in the formation of groups that only those computer nodes 110 and storage nodes 130 which have a common, local connection structure are able to form a computer group 120.

In a following step 530, a number s of data segments is defined which are to be processed by the high-availability computer system 100. It must be noted here that each computer group 120 should have at least one redundant computer node 110 to establish the high availability. If, for example, a total of 20 computer nodes 110 are available in five computer groups 120, each with four computer nodes 110, the data to be processed can therefore be divided up into, a maximum of five times three, i.e., 15, data segments. The remaining live computer nodes 110 form the redundant nodes of the five computer groups 120.

The data D to be processed are divided into data segments $d_1$ to $d_s$ in step 540. This division is carried out depending on the requirements of the respective application and is therefore not described in detail here. For example, an extensive database 150 can be divided up into database segments 140, each with one or a multiplicity of tables, columns and/or rows which are then individually interrogatable by different computer nodes 110 to determine a respective partial result of a whole query.

In the following steps 550*a* to 550*s*, the data segments $d_1$ to $d_s$ required to process partial queries are allocated to the computer nodes 110 such that the required number of redundant computer nodes 110 remains in each computer group 120. In the part described above, only three data segments d are thus allocated to each group of four computer nodes 110. The allocated data segments d are then stored on the storage nodes 130 which are allocated to a respective computer group 120 which contains the computer nodes 110 to perform the partial queries. Steps 550*a* to 550*s* can be carried out in parallel with one another or after one another.

Figure 6:
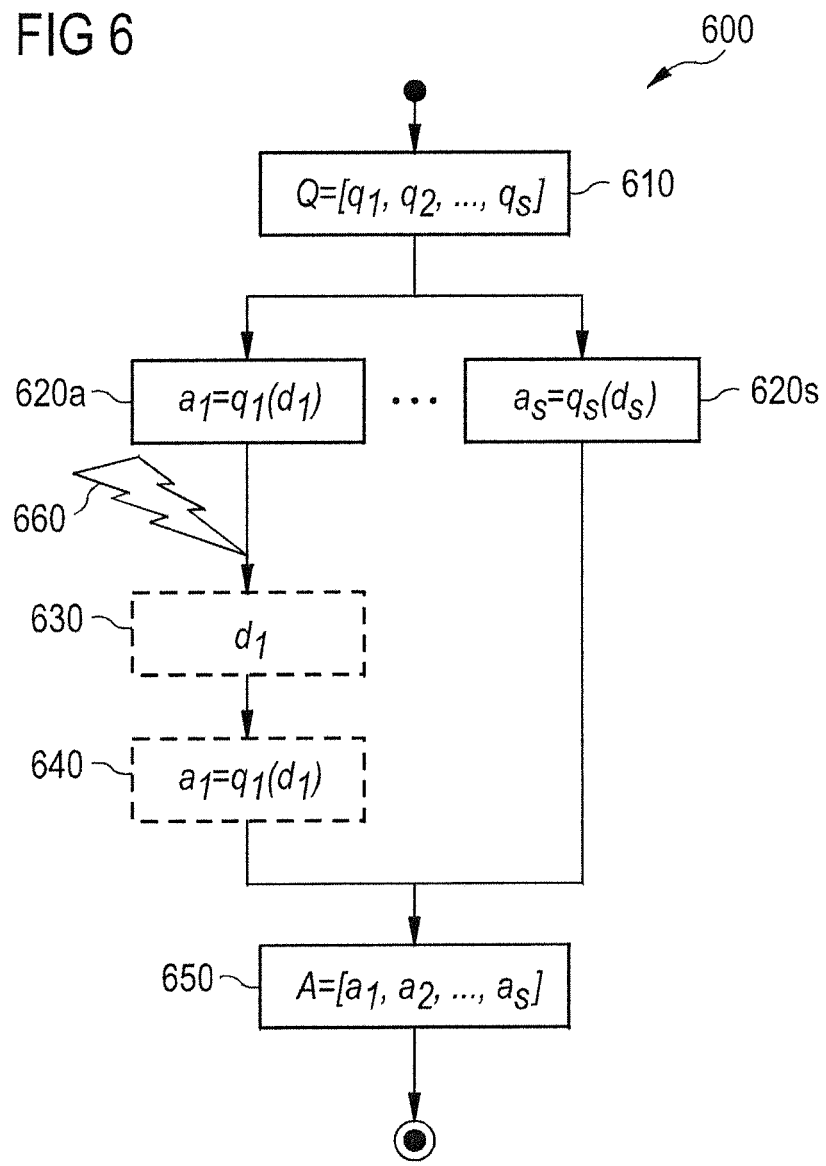
FIG. 6 shows a flow diagram of an operating method for a high-availability computer system.

FIG. 6 schematically shows an operating method 600, for example, for the computer system 100 shown in FIG. 1 and initialized with the method according to FIG. 5.

The method 600 begins in step 610 with the receipt of a query Q. For example, the query Q may be a database query for an in-memory database 150. In step 610, the whole query Q is divided up into a plurality of partial queries $q_1$ to $q_s$ which can be processed separately by the individual computer nodes 110 of the high-availability computer system 100.

The partial queries $q_1$ to $q_s$ are performed in steps 620*a* to 620*s*, which are carried out in parallel with one another, by the computer node 110 allocated to the corresponding data segment 140. For example, a first computer node 110*a* of a first computer group 120*a* performs the first partial query $q_1$ via a first database segment $d_1$ comprising a first table or a first partial segment of a table of an extensive database 150 and determines the associated partial response $a_1$. In an equivalent manner, a computer node 110*s* of the mth computer group 120*m* takes over the performance of the query q, via the data segment $d_s$ comprising a thriller table or a further partial segment of the extensive database 150 to determine the sth partial response $a_s$.

Insofar as the individual partial queries $q_1$ to $q_s$ can be processed successfully by the individual computer nodes 110, a whole response A is defined from the partial responses $a_1$ to $a_s$ in a step 650, for example by a central control computer or by a suitable client computer 160, and is sent back to the requesting user or the requesting application.

FIG. 6 additionally shows the process of the method 600 when a fault 660 occurs. If, for example, the performance of the first partial query $q_1$ is disrupted in step 620*a*, for example in the event of a hardware defect or software crash of the first computer node 110, a redundant outer node 110 loads the data segment $d_1$ previously processed by the computer node 110*a* in a step 630. Alternatively or additionally, the redundant computer node 110 can also take over the memory content of the failed computer node 110*a*, for example, by evaluating the log file 190 described above. The reloading of data by the redundant computer node 110 in no way hinders the parallel performance of other partial queries q by computer nodes 110 of other computer groups 120, and in no way or barely hinders the parallel performance of other partial queries q by computer nodes 110 of the same computer groups 120, since the computer nodes 110 and associated storage nodes 130 or always interconnected via high-performance, local connection structures.

In a following step 640, the redundant computer node 110 then performs the query $q_1$ via the data segment $d_1$ to obtain the requested partial result $a_1$. The partial result $a_1$ determined by the redundant computer node 110 is then, as described above, linked to the partial results of the other computer nodes in a step 650 to produce a whole response A. The failure of the individual computer node 110 is thus perceivable for the user only in the form of a longer response time.

Although the high-availability computer system 100 and the working methods 500 and 600 suitable for it have been described with reference to a parallel in-memory database, the architecture described therein is also suitable to solve a multiplicity of different computing and/or data-intensive problems of electronic data processing, of the type which occur, in particular, in grid computing, extensive simulations, data mining and similar problems of electronic data processing.

One element of the architecture and working methods described lies, inter alia, in the division of a single pool of computer nodes 110 into a multiplicity of respectively redundant computer groups 120, wherein each computer group 120 contains at least one redundant computer node 110. Due to the reduction in size of the computer groups 120 to a number reduced in comparison with the total number n of computer nodes 110 used, the use of local connection structures with a relatively small number of branches ("fan-out"), in particular Direct Attached Storage or InfiniBand connections with little latency and high bandwidth, for example via, switched PCIe connections, is enabled. Alternatively or additionally, direct access to the main memories of the individual computer nodes 110 of a computer group 120 among themselves according to Lara RDMA standard is possible.

The extreme input/output data rates of for example, 1 Gbit/s and more of mass storage devices of more recent design such as, in particular, semiconductor mass storage devices can be fully exploited by a partitioning of this type without forfeiting the required redundancy within a redundant computer group 120. However, due to the partitioning, the number of required redundant computer nodes 110 to be retained is increased according to the number m of computer groups 120 used.

My systems and method are therefore suitable, in particular, for particularly high-performance, parallel-running, high-availability computer systems 100 with a multiplicity of computer nodes 110. The computer nodes 110 together have a very large main memory of, for example, 1 TB or more storage capacity to process extensive data. For example, a computer system 100 with several tens or hundreds of computer nodes 110 can be partitioned to computer groups 120 of, for example, 2, 4, 8 or 16 computer nodes 110, each with one or more redundant computer nodes 110 contained in the group.

The features of the individual systems and methods shown in FIGS. 1 to 6 and described in detail in the description of examples can be combined with one another in many ways to achieve the respectively described advantages.

The invention claimed is:

1. A database system configured as a high-availability computer system that provides a parallel-operating database, the database system comprising:
a plurality of computer nodes for parallel data processing, wherein each computer node has at least one data processing component and a main memory;
a plurality of storage nodes, wherein each storage node has at least one non-volatile mass storage device; and
at least one data network to access the plurality of computer nodes, wherein
data of the database is divided into a plurality of independently interrogatable database segments;
the plurality of computer nodes is partitioned into a plurality of computer groups;
each of the plurality of computer groups has at least one redundant computer node;
each storage node of the plurality of storage nodes is allocated to precisely one computer group of the plurality of computer groups and stores at least those data segments, which are to be processed by a computer node of the respective computer group;
each computer group has a local connection structure allocated to the respective computer group, said structure connecting the storage nodes allocated to the respective computer group to computer nodes of the respective computer group;
in operation of the database system, each database segment is allocated to a computer node of the plurality of computer nodes and stored in the main memory of the allocated computer node;
wherein, in operation of the database system, a query received by the database system is divided up into a plurality of partial queries, which can be processed separately and in parallel with one another by the plurality of computer nodes allocated to the corresponding data segment of the database system;
and, in case of a failure of a first computer node of a first computer group, the at least one redundant computer node of the first computer group loads the database segment allocated to the failed first computer node from a first storage node, allocated to the first computer group and locally connected to the failed first computer node and the at least one redundant computer node of the first computer group, into the main memory of the redundant computer node of the first computer group in order to replace the failed first computer node for processing of partial queries relating to the database segment allocated to the failed first computer node.

2. The database system according to claim 1, wherein the plurality of computer nodes comprises a first number (n) of computer nodes, the data of the database is divided into a second number of independently interrogatable database segments, and the first number (n) of computer nodes is partitioned into a third number (m) of computer groups, wherein the third number (m) is greater than or equal to two, and the second number (s) is less than or equal to the difference (n–m) between the first number (n) and the third number (m).

3. The database system according to claim 1, wherein the at least one local connection structure allocated to the respective computer groups has a bandwidth greater than a bandwidth of the at least one data network.

4. The database system according to claim 1, wherein at least one first computer node of at least one first computer group is arranged in a first module of a server system and at least one first storage node allocated to the first computer group is arranged in a second module of the server system, and wherein the at least one first computer node and the at least one first storage node are interconnected via at least one Direct Attached Storage, DAS, connection.

5. An in-memory database system, comprising
a plurality of computer nodes for parallel data processing, wherein each computer node has at least one data processing component and a main memory; and
a plurality of storage nodes, wherein each storage node has at least one non-volatile mass storage device; wherein
data of at least one database provided by the in-memory database system is divided into a plurality of independently interrogatable database segments;
each database segment of the plurality of database segments is allocated to a computer node of the plurality of computer nodes and is stored in at least one non-volatile mass storage device of a storage node locally connected to the allocated computer node;

the plurality of computer nodes is partitioned into a plurality of computer groups;

each of the plurality of computer groups comprises at least one redundant computer node to which, in a normal operation of the in-memory database system, no database segment of the plurality of database segments is allocated;

each storage node of the plurality of storage nodes is allocated to precisely one computer group of the plurality of computer groups and stores at least those database segments, which are allocated to the computer nodes of the respective computer group;

in operation of the in-memory database system, each database segment of the plurality of database segments is loaded in parallel from the at least one non-volatile mass storage device of the locally connected storage node into the main memory of the respective computer node, to which the database segment is allocated; and at least one query is divided into a plurality of partial queries for parallel processing by respective computer nodes of the plurality of computer nodes, each query relating to a different one of the plurality of database segments allocated to a respective database segment;

and, in case of a failure of a first computer node of a first computer group, the at least one redundant computer node of the first computer group loads the database segment allocated to the failed first computer node from a first storage node, allocated to the first computer group and locally connected to the failed first computer node and the at least one redundant computer node of the first computer group, into the main memory of the redundant computer node of the first computer group in order to replace the failed first computer node for processing of partial queries relating to the database segment allocated to the failed first computer node.

6. The in-memory database system according to claim 5, wherein at least the first computer group comprises a local connection structure, said local connection structure connecting the storage nodes allocated to the first computer group to computer nodes of the first computer group and has a bandwidth greater than a bandwidth of at least one data network connecting the computer nodes of the first computer group with computer nodes of any other computer group.

7. The in-memory database system according to claim 6, wherein the local connection structure of the at least one first computer group comprises at least one parallel switching fabric for the selective connection of each one of the computer nodes of the first computer group to each one of the storage nodes allocated to the first computer group via a plurality of connection paths parallel to one another.

8. The in-memory database system according to claim 5, wherein at least one first computer node is arranged in a first module of a server system and at least one first storage node locally connected to the first computer node is arranged in a second module of the server system, wherein the at least one first computer node and the at least one first storage node are interconnected via at least one Direct Attached Storage, DAS, connection.

9. The in-memory database system according to claim 5, further comprising at least one central management component, wherein the at least one query is divided into the plurality of partial queries by the at least one central management component.

10. The in-memory database system according to claim 5, wherein the plurality of computer nodes comprises a first number (n) of computer nodes, the data of the at least one database is divided into a second number of independently interrogatable database segments, and the first number (n) of computer nodes is partitioned into a third number (m) of computer groups, wherein the third number (m) is greater than or equal to two, and the second number (s) is less than or equal to the difference (n–m) between the first number (n) and the third number (m).

11. A method for operating an in-memory database system, the system comprising a plurality of computer nodes for parallel data processing and a plurality of storage nodes, wherein the plurality of computer nodes is partitioned into a plurality of computer groups, each of the plurality of computer groups comprises at least one redundant computer node, and each storage node of the plurality of storage nodes is allocated to precisely one computer group of the plurality of computer groups; wherein the method comprises:

dividing data of at least one database provided by the in-memory database system into a plurality of independently interrogatable database segments;

allocating each database segment of the plurality of database segments to a computer node of the plurality of computer nodes, wherein, in a normal operation of the in-memory database system, no database segment of a plurality of database segments is allocated to the at least one redundant computer node of each computer group of the plurality of computer groups;

storing each allocated database segment of the plurality of database segments in at least one non-volatile mass storage device of a storage node locally connected to the allocated computer node, wherein each storage node of the plurality of storage nodes allocated to a computer group of the plurality of computer groups stores database segments, which are allocated to the computer nodes of the respective computer group;

loading each database segment of the plurality of database segments in parallel from the at least one non-volatile mass storage device of the respective locally connected storage node into a main memory of the respective computer node, to which the respective database segment is allocated;

dividing at least one query into a plurality of partial queries relating to a different one of the plurality of database segments allocated to a respective database segment;

processing the plurality of partial queries in parallel by the respective computer nodes of the plurality of computer nodes allocated to the respective database segments;

in case of a failure of a first computer node of a first computer group, loading, by the at least one redundant computer node of the first computer group, the database segment allocated to the failed first computer node from a first storage node, allocated to the first computer group and locally connected to the failed first computer node and the at least one redundant computer node of the first computer group, into a main memory of the redundant computer node of the first computer group; and processing, by the at least one redundant computer node of the first computer group, a partial query related to the database segment allocated to the failed first computer node.

12. The method according to claim 11, further comprising:

determining a plurality of partial responses corresponding to the plurality of partial queries; and defining a complete response to the at least one query from the plurality of partial responses.

13. The method according to claim 12, wherein the in-memory database system further comprises at least one central management component, and wherein the steps of dividing at least one query into a plurality of partial queries and defining a complete response to the at least one query are performed by the at least one central management component.

14. The method according to claim 12, further comprising:
   sending, by a client computer, the at least one query in parallel to the plurality of computer nodes; and
   defining a complete response to the at least one query by the client computer system.

15. The method according to claim 11, further comprising:
   taking over, by the redundant computer node of the first computer group, a memory content of the failed first computer node.

16. The method according to claim 15, wherein the redundant computer node of the first computer group evaluates a log file generated by the failed first computer node before occurrence of the failure to take over the memory content of the failed first computer node.

* * * * *